United States Patent
Schuhmacher et al.

(10) Patent No.: US 8,857,913 B2
(45) Date of Patent: Oct. 14, 2014

(54) SEAT ASSEMBLY WITH BUSHING

(75) Inventors: Stefan Schuhmacher, Allershausen (DE); Michael Heinrich Joop Heyer, Hainhausen (DE)

(73) Assignee: Lear Corporation, Southfield, MI (US)

( * ) Notice: Subject to any disclaimer, the term of this patent is extended or adjusted under 35 U.S.C. 154(b) by 406 days.

(21) Appl. No.: 13/056,210

(22) PCT Filed: Sep. 23, 2008

(86) PCT No.: PCT/US2008/077354
§ 371 (c)(1),
(2), (4) Date: May 9, 2011

(87) PCT Pub. No.: WO2010/036238
PCT Pub. Date: Apr. 1, 2010

(65) Prior Publication Data
US 2011/0204691 A1    Aug. 25, 2011

(51) Int. Cl.
*A47C 7/02* (2006.01)
*B60N 2/235* (2006.01)
*B60N 2/68* (2006.01)

(52) U.S. Cl.
CPC ........... *B60N 2/2356* (2013.01); *B60N 2205/50* (2013.01); *B60N 2/682* (2013.01)
USPC .................. 297/452.2; 297/354.1; 297/463.1; 16/2.1

(58) Field of Classification Search
USPC ......... 297/354.12, 373, 452.18, 452.2; 16/2.1
See application file for complete search history.

(56) References Cited

U.S. PATENT DOCUMENTS

| | | | | |
|---|---|---|---|---|
| 3,501,198 A | * | 3/1970 | Boyce | 297/373 |
| 3,843,833 A | * | 10/1974 | Nicholson | 174/153 G |
| 4,218,092 A | | 8/1980 | Schach et al. | |
| 4,359,133 A | * | 11/1982 | Krolak | 181/172 |
| 4,456,300 A | | 6/1984 | Kluting et al. | |
| 4,826,249 A | | 5/1989 | Bradbury | |
| 4,883,319 A | | 11/1989 | Scott | |
| 5,280,138 A | * | 1/1994 | Preston et al. | 174/152 G |
| 5,294,225 A | * | 3/1994 | Kazino et al. | 411/182 |
| 5,634,689 A | | 6/1997 | Putsch et al. | |
| 6,106,068 A | * | 8/2000 | Lefevere | 297/367 R |

(Continued)

FOREIGN PATENT DOCUMENTS

| | | |
|---|---|---|
| DE | 1554063 A1 | 11/1969 |
| DE | 69412350 T2 | 3/1999 |

(Continued)

OTHER PUBLICATIONS

German Patent and Trademark Office, Office Action for corresponding German Patent Application No. 11 2008 004 005.2 mailed Mar. 5, 2013.

(Continued)

*Primary Examiner* — David E Allred
(74) *Attorney, Agent, or Firm* — Brooks Kushman P.C.

(57) ABSTRACT

A seat assembly having a seat bottom and a seat back. The seat back includes first and second side members and a cross member. The cross member has an extended portion that extends from the first side member. A bushing is disposed on the extended portion and is received by a hole in the seat bottom to support pivotal movement of the seat back.

15 Claims, 2 Drawing Sheets

(56) References Cited

U.S. PATENT DOCUMENTS

| | | |
|---|---|---|
| 6,227,595 B1 | 5/2001 | Hamelin et al. |
| 6,502,799 B2 | 1/2003 | Lepaule |
| 6,685,272 B1 | 2/2004 | Bonk et al. |
| 6,709,040 B1 | 3/2004 | Drew et al. |
| 8,434,823 B2 * | 5/2013 | Du et al. ............... 297/362.11 |
| 2003/0020306 A1 | 1/2003 | Eckendorff |
| 2003/0117003 A1 | 6/2003 | Fourrey et al. |
| 2005/0248200 A1 | 11/2005 | Pradier et al. |
| 2006/0244298 A1 * | 11/2006 | Runde ............... 297/391 |
| 2008/0163453 A1 * | 7/2008 | Joseph ............... 16/2.1 |
| 2009/0033129 A1 * | 2/2009 | Marshall ............... 297/69 |
| 2011/0133538 A1 * | 6/2011 | Adragna et al. ......... 297/452.18 |
| 2012/0098313 A1 * | 4/2012 | Cartis et al. ............... 297/354.12 |
| 2012/0192379 A1 * | 8/2012 | Amirian et al. ............... 16/2.5 |
| 2013/0001997 A1 * | 1/2013 | Gallienne et al. ........ 297/354.12 |
| 2013/0033081 A1 * | 2/2013 | Aoi et al. ............... 297/354.1 |

FOREIGN PATENT DOCUMENTS

| | | |
|---|---|---|
| DE | 20302937 U1 | 7/2004 |
| DE | 60125724 T2 | 12/2007 |
| FR | 2772317 A1 | 6/1999 |

OTHER PUBLICATIONS

Chinese Patent and Trademark Office, Office Action for the corresponding Chinese Office Action 200880130964.0 mailed Oct. 17, 2013.

* cited by examiner

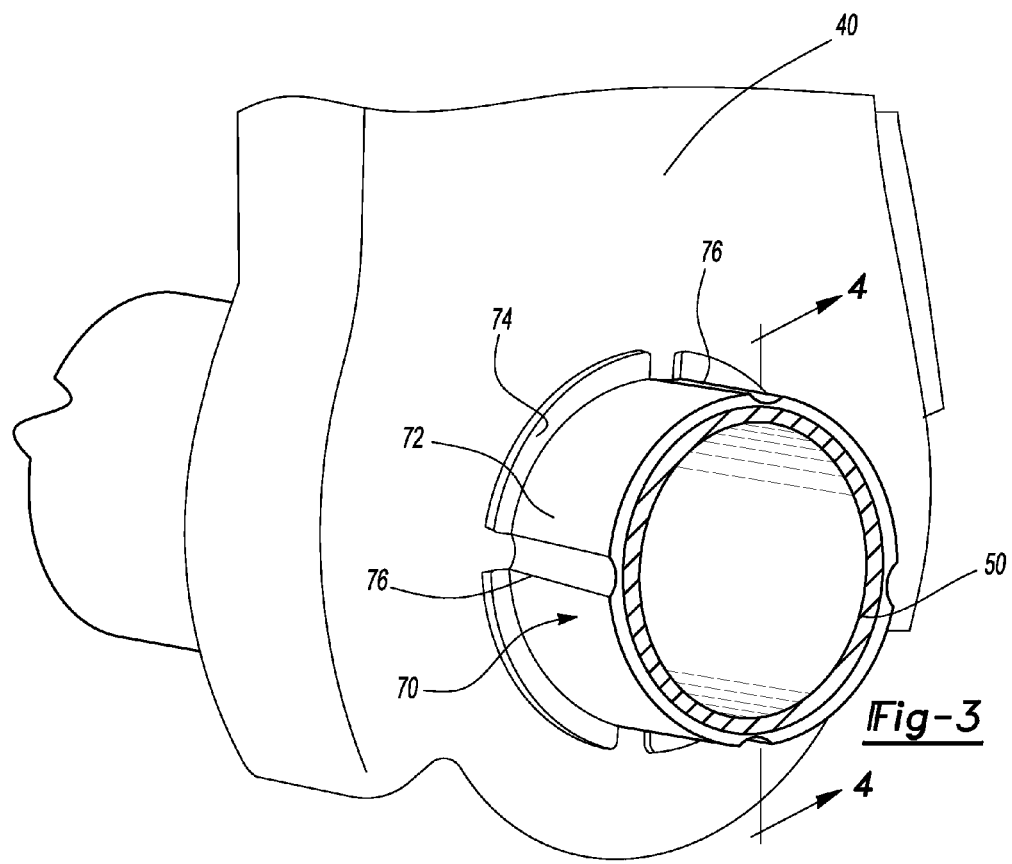
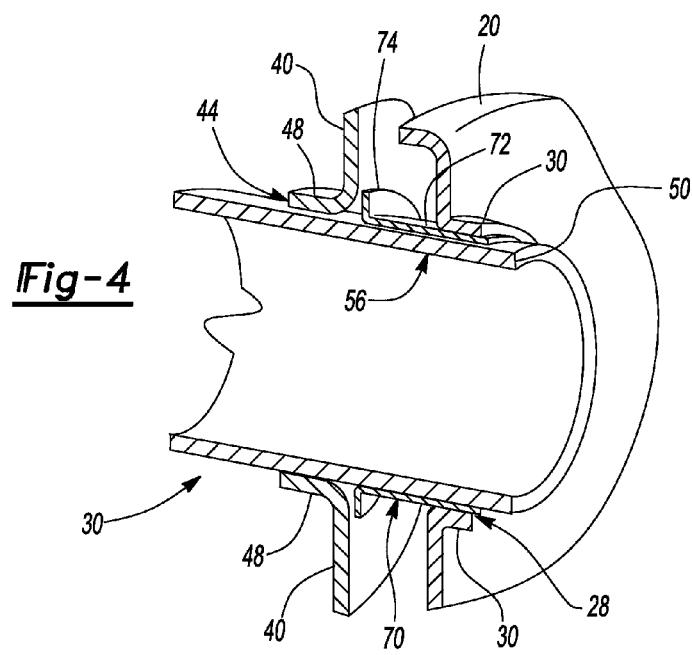

SEAT ASSEMBLY WITH BUSHING

BACKGROUND OF THE INVENTION

Field of the Invention

The present invention relates to a seat assembly having a bushing that facilitates pivotal movement of a seat back.

SUMMARY OF THE INVENTION

In at least one embodiment, a seat assembly is provided. The seat assembly has a seat bottom, a seat back, and a bushing. The seat back includes a first side member, a second side member, and a cross member. The cross member extends through the first and second side members and has an extended portion that extends from the first side member. The bushing is disposed on the extended portion and is received by a hole in the seat bottom to support pivotal movement of the seat back.

In at least one embodiment, a seat assembly is provided that has a seat bottom, a seat back, and a bushing. The seat bottom has first and second seat bottom side members having first and second openings, respectively. The first opening is at least partially defined by an opening wall that extends from the first seat bottom side member toward the second seat bottom side member. The seat back has first and second seat back side members and a cross member. The first and second seat back side members have first and second holes, respectively. The first hole is a least partially defined by a hole wall that extends from the first seat back side member. The cross member extends through the first and second holes and the first and second openings and has an extended portion that protrudes from the first hole and away from the seat bottom. The bushing is disposed around the extended portion that contacts the seat back and the seat bottom and permits the seat back to pivot with respect to the seat bottom.

In at least one embodiment, a vehicle seat assembly is provided that has a seat bottom and a seat back pivotally disposed on the seat bottom. The seat back has a first side member having a first hole, a second side member spaced apart from the first side member and having a second hole, and a tubular cross member that extends through the first and second holes. The tubular cross member is fixedly coupled to the first and second side members and includes an extended portion that extends outwardly from the first side member and away from the second side member. A bushing extends around the extended portion and is received by the first hole in the seat bottom to support pivotal movement of the seat back.

BRIEF DESCRIPTION OF THE DRAWINGS

FIG. 3 is a magnified perspective view of a portion of the seat assembly.

FIG. 4 is a perspective section view along line 4-4 in FIG. 3.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
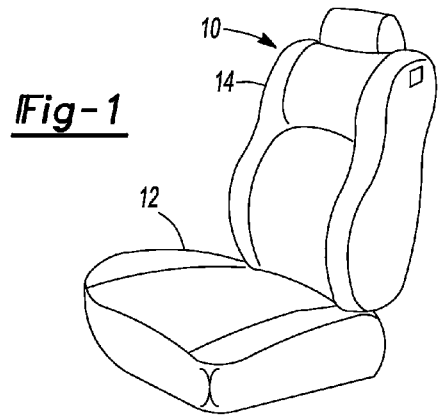
FIG. 1 is a perspective view of a seat assembly.

Referring to FIG. 1, an exemplary seat assembly 10 is shown. The seat assembly 10 may be configured for use in a vehicle, such as a motor vehicle like a car or truck.

The seat assembly 10 may include a seat bottom 12 and a seat back 14. The seat bottom 12 may be configured to be mounted on a support surface, such as a floor pan of a vehicle. The seat back 14 may be pivotally disposed on the seat bottom 12 as will be described in more detail below.

Figure 2:
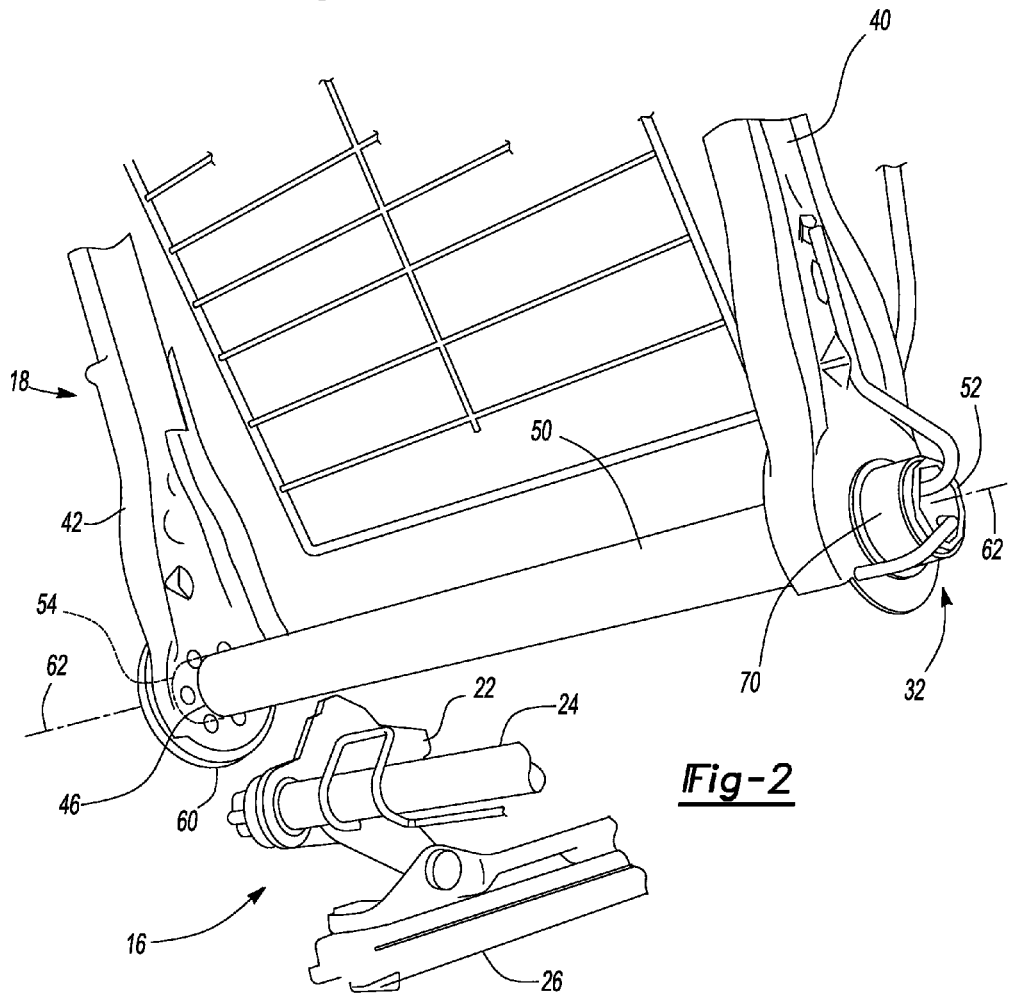
FIG. 2 is a fragmentary perspective view of the seat assembly.

Referring to FIGS. 2-4, the seat bottom 12 and seat back 14 may each include structural frames. For example, the seat bottom 12 may include a seat bottom frame 16 and the seat back 14 may include a seat back frame 18. The seat back and seat bottom frames 16, 18 may be made of any suitable material or materials, such as a metal like an aluminum alloy.

The seat bottom frame 16 may have any suitable configuration. In at least one embodiment, the seat bottom frame 16 may include first and second side members 20, 22 disposed opposite each other. For example, the second side member 22 may generally be a reflected or mirror image of the first side member 20 in one or more embodiments of the present invention. One or more cross members 24 may extend between the first and second side members 20, 22. At least one track assembly 26 may be coupled to the seat bottom frame 16 to facilitate fore and aft positioning of the seat assembly 10. For instance, a lower track of the track assembly 26 may be fixedly mounted to the support surface while an upper track may be coupled to the seat bottom frame 16. A hole 28 may be provided with one or more of the side members, such as the first side member 20. As is best shown in FIG. 4, the hole 28 may be at least partially defined by a wall 30, such as a cylindrical wall, that extends from at least one side of the first side member 20. The wall 30 may be provided during manufacture of the side member, such as by plunging or piercing the side member to create the hole 28.

The seat back frame 18 may have any suitable configuration. In at least one embodiment, the seat back frame 18 may include first and second side members 40, 42 disposed opposite each other that may have first and second openings 44, 46, respectively. The first and/or second openings 44, 46 may be at least partially defined by a wall that extends from at least one side of a side member 40, 42, such as hole wall 48 shown in FIG. 4.

One or more cross members may extend between and may be fixedly attached to the first and second side members 40, 42. For example, a cross member 50 may be provided near the bottom of the first and second side members 40, 42. In at least one embodiment, the cross member 50 may have a tubular configuration and may extend through the first and/or second seat back side members 40, 42. For example, the cross member 50 may include a first end 52 that extends through the first opening 44 and a second end 54 disposed opposite the first end 52 that extends through the second opening 46. For convenience in reference, the portion of the cross member 50 that extends through the first side member 40 and outwardly toward a side of the seat assembly 10 will be referred to as an extended tube portion 56.

A recliner mechanism 60 may be provided to help facilitate pivotal movement of the seat back 14. The recliner mechanism 60 may be disposed between the second side members 22, 42 of the seat bottom and seat back, respectively. The recliner mechanism 60 may be generally disk shaped and may be fixedly positioned with respect to the seat bottom frame 16. For example, the recliner mechanism 60 may be welded to the second seat bottom side member 22. The recliner mechanism 60 may be selectively enabled and disabled to permit and inhibit pivotal movement of the seat back 14 about an axis of rotation 62 in a manner known by those skilled in the art.

Referring to FIGS. 2-4, a bushing 70 may be provided with the seat assembly 10. The bushing 70 may permit the seat back to freely pivot in the absence of a sufficient restraining force, such as may be provided by the recliner mechanism 60. The bushing 70 may be made of any suitable material or materials, such as a polymeric material. The bushing 70 may be disposed on or around the extended tube portion 56 and may provide a bearing surface for engagement with the seat bottom frame 16. In at least one embodiment, the bushing 70 may include a tubular body 72, which may be generally cylindrical, and a flange portion 74. The flange portion 74 may be disposed at an end of the tubular body 72. The bushing 70 may include one or more elongated indentations 76 or grooves that may be spaced apart and disposed parallel to each other. The elongated indentations may be generally linear and may include a curved bottom surface. The elongated indentations 76 may extend the length of the tubular body 72 and through the flange portion 74 in one or more embodiments of the present invention. The configuration of the bushing 70 may help eliminate play between the extended tube portion 56 and the seat bottom 12 and compensate for component tolerances. For example, the bushing 70 may float or move along the extended portion 56 to accommodate tolerance differences between the seat bottom 12 and seat back 14.

As is best shown in FIG. 4, the flange portion 74 may contact a portion of the seat back frame 18, such as the first side member 40, to help position and restrict movement of the bushing 70. In addition, the tubular body 72 may extend into or through a hole in a portion of the seat bottom frame 16, such as the first side member 20. As such, the tubular body 72 may contact the hole wall 30, which provides an extended surface area to help distribute load forces upon the bushing 70.

The bushing 70 may cooperate with the extended tube portion to help support the seat assembly 10 in a manner that allows a seat assembly 10 to be provided with a single recliner mechanism rather than having a recliner mechanism disposed on each side of the seat assembly. Moreover, the seat back cross member 50 may help transfer torque to the recliner mechanism 60 during a vehicle impact event to help distribute vehicle impact load forces and control seat back positioning.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly comprising:
    a seat bottom;
    a seat back including:
        a first side member,
        a second side member, and
        a cross member extending through the first and second side members, the cross member including an extended portion that extends from the first side member; and
    a bushing disposed on the extended portion and received by a hole in the seat bottom to support pivotal movement of the seat back, wherein the bushing extends from the first side member into the hole and has a tubular body that is received in the hole and that has a first end and a second end, a flange portion that extends from the second end of the tubular body and engages the first side member and is spaced apart from the seat bottom, and a plurality of elongated indentations that extend between the first end and the second end of the tubular body such that the plurality of elongated indentations extend through the flange portion.

2. The seat assembly of claim 1 wherein the cross member is fixedly positioned on the first and second side members.

3. The seat assembly of claim 1 wherein the cross member extends along an axis of rotation of the seat back.

4. The seat assembly of claim 1 further comprising a recliner mechanism disposed proximate an end of the cross member that is disposed opposite the extended portion.

5. The seat assembly of claim 1 wherein the hole further comprises a cylindrical wall that extends away from the seat back.

6. The seat assembly of claim 1 wherein the plurality of elongated indentations are disposed in the hole and spaced apart from the first side member.

7. The seat assembly of claim 1 wherein the plurality of elongated indentations are arranged around the cross member such that each elongated indentation faces away from the cross member and is disposed directly opposite another elongated indentation.

8. The seat assembly of claim 1 wherein the bushing is concentrically disposed along an axis of rotation of the seat back.

9. A seat assembly comprising:
    a seat bottom having first and second seat bottom side members having first and second openings, respectively, wherein the first opening is at least partially defined by an opening wall that extends from the first seat bottom side member toward the second seat bottom side member;
    a seat back including:
        first and second seat back side members having first and second holes, respectively, wherein the first hole is a least partially defined by a hole wall that extends from the first seat back side member;
        a cross member that extends through the first and second holes and the first and second openings, the cross member having an extended portion that protrudes from the first hole; and
    a bushing disposed around the extended portion that contacts the seat back and the seat bottom, wherein the bushing permits the seat back to pivot with respect to the seat bottom and the bushing has a tubular body that extends through the first hole and that has a first end and a second end, a flange portion that extends from the second end of the tubular body and engages the first seat back side member and is spaced apart from the seat bottom, and a plurality of elongated indentations that extend from the first end to the second end of the tubular body such that the plurality of elongated indentations extend through the flange portion and have a curved bottom surface.

10. The seat assembly of claim 9 wherein the opening wall and hole wall extend in opposite directions.

11. The seat assembly of claim 9 wherein the cross member is fixedly disposed on the first and second seat back side members.

12. The seat assembly of claim 9 wherein the flange portion is disposed between the first seat back side member and the first seat bottom side member.

13. The seat assembly of claim 12 wherein the cross member is concentrically disposed about an axis of rotation of the seat back.

14. The seat assembly of claim 9 further comprising a single recliner mechanism coupled to the seat bottom and the seat back that selectively enables and disables pivotal movement of the seat back.

15. The seat assembly of claim 9 wherein the cross member is configured as a hollow tube.

* * * * *